United States Patent [19]
La Duca

[11] 3,735,239
[45] May 22, 1973

[54] LINE VOLTAGE REGULATOR UTILIZING LINE VOLTAGE RESPONSIVE TIMING CIRCUIT TO MODULATE DUTY CYCLE OF CONTROLLABLE RECTIFIER

[75] Inventor: Joseph La Duca, Stirling, N.J.

[73] Assignee: Bell Telephone Laboratories, Incorporated, Murray Hill, N.J.

[22] Filed: Nov. 24, 1971

[21] Appl. No.: 201,636

[52] U.S. Cl. .................321/16, 321/18, 321/40, 323/22 SC
[51] Int. Cl. .............................................H02m 7/22
[58] Field of Search....................321/16, 18, 24, 40; 307/252 N, 252 P; 323/22 SC

[56] References Cited
UNITED STATES PATENTS

| | | |
|---|---|---|
| 2,477,946 | 8/1949 | Smith...........................321/16 X |
| 2,085,596 | 6/1937 | Lord................................321/18 |
| 3,412,314 | 11/1968 | Crane..............................321/16 |
| 3,417,312 | 12/1968 | Someda............................321/18 |
| 2,694,172 | 11/1954 | Trousdale...................321/18 X |

Primary Examiner—J. D. Miller
Assistant Examiner—H. Huberfeld
Attorney—W. L. Keefauver

[57] ABSTRACT

An AC to DC converter regulates its output voltage with respect to line voltage changes by utilizing a line voltage responsive gating signal to control silicon controlled rectifiers in the output rectifier. The gating signals are generated by offsetting a voltage generated by a line voltage responsive timing circuit against a reference voltage.

5 Claims, 2 Drawing Figures

LINE VOLTAGE REGULATOR UTILIZING LINE VOLTAGE RESPONSIVE TIMING CIRCUIT TO MODULATE DUTY CYCLE OF CONTROLLABLE RECTIFIER

BACKGROUND OF THE INVENTION

This invention relates to line voltage regulators. It is specifically concerned with the regulation of an AC to DC converter voltage output by phase control of the rectifying devices to compensate for changes in the input voltage.

Typical circuit arrangements to stabilize the voltage output of an AC to DC converter with respect to variations in the input voltage utilize nonlinear magnetic devices such as saturating reactors and transformers. Most of these arrangements are operated in a ferroresonant mode, i.e., a capacitor is connected across the saturating reactor or transformer so that it resonates with the inductance at some particular voltage. The resonant state is dependent on the magnitude of the applied voltage since the inductance varies with the applied voltage. A small variation in the magnitude of the applied voltage changes the occurrence of resonance of the circuit. Ferroresonant arrangements are excellent line regulators. However, they are inefficient in operation because the magnetic devices must be saturated during each half cycle of operation.

Other line regulation arrangements may comprise the utilization of error detectors and voltage regulation units which are separate and apart from the converter transformer. These arrangements, while more efficient than the ferroresonant arrangements, generally require a feedback circuit interconnecting the output and input of the circuit. This arrangement generally includes a separate transformer in the feedback circuit to isolate the output and input sides of the converter.

It is, therefore, an object of the invention to stabilize the voltage output of an AC to DC converter with respect to variations in the input voltage.

It is another object of the invention to regulate the rectified output voltage of a converter transformer which operates in the linear region only without requiring a separate feedback circuit.

It is yet another object of the invention to maintain complete isolation between the input and output sides of a voltage regulated converter.

SUMMARY OF THE INVENTION

According to the invention, the output voltage of an AC to DC converter is stabilized with respect to input voltage variations by intermittently gating the rectified output voltage of the converter. The output signal is gated in an inverse proportion to variations in the magnitude of the input voltage. A gating control signal is derived by offsetting a reference voltage with an exponentially decaying voltage derived from the input voltage. The reference voltage and the exponentially decaying voltage are both derived from separate transformer windings on the secondary side of the converter transformer. The gating control signal determines the firing point of the controlled rectifiers in the converter output rectifying circuit. since the exponentially decaying voltage is dependent on the magnitude of the line voltage, the duty cycle of the controlled rectifier is modified to compensate for changes in the line voltage.

BRIEF DESCRIPTION OF THE DRAWINGS

Many additional objects and features of the invention will become apparent upon consideration of the following detailed description of a specific AC to DC converter utilizing the principles of the invention. The following description is to be taken in conjunction with the attached drawing in which.

DETAILED DESCRIPTION

Figure 1:
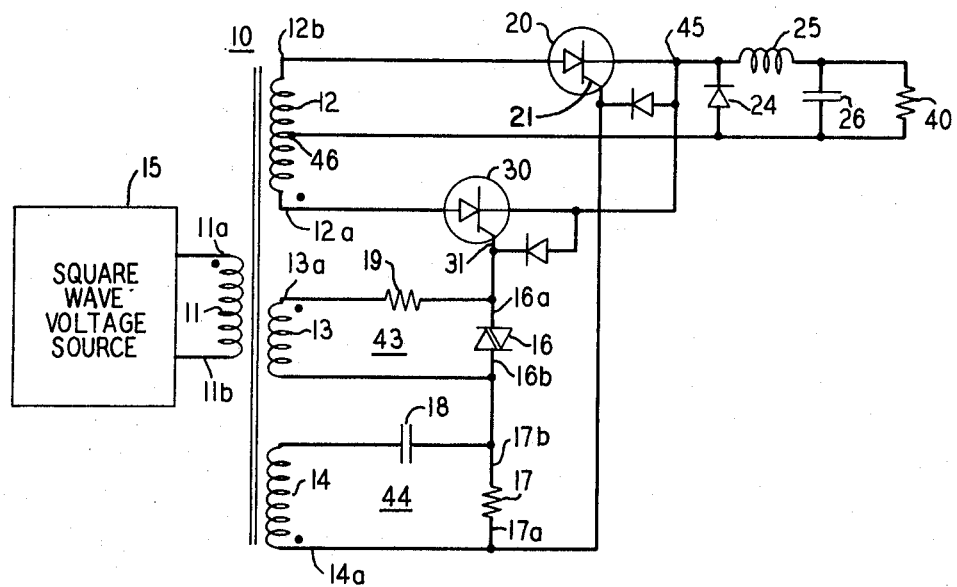
FIG. 1 is a schematic of an AC to DC converter embodying the principles of the invention.

The circuit shown in FIG. 1 is an AC to DC converter which stabilizes the output voltage with respect to line voltage variations by controlling the time that the output rectifier devices conduct. The output rectifier devices are controlled by a control signal which is responsive to variations in the input voltage.

The AC to DC converter is driven by a basic energy source which, in the illustrative embodiment, comprises the AC square wave voltage source 15. The signal output of the voltage source 15 is shown by waveform A in FIG. 2 which depicts a square wave. While the driving signal for the converter herein is shown to be a square wave, it is to be understood that the invention will operate equally well with signal inputs having other periodic waveforms such as, for example, a sinusoidal waveform.

The output of the square wave voltage source 15 is connected to the input terminals 11a and 11b of the input winding 11 of the converter transformer 10. The converter transformer 10 includes an output winding 12 whose two terminals 12a and 12b are connected to the silicon controlled rectifiers 30 and 20, respectively. The outputs of the silicon controlled rectifiers 20 and 30 are connected to a common node 45 to form a full-wave rectifier configuration. The node 45 is connected to an output filter inductor 25 which, in turn, is connected to an output load 40. The opposite terminal of the load 40 is connected to the center tap 46 of the winding 12. The output filter also includes a filtering capacitor 26 which shunts the load 40 and a flyback diode 24 which connects the node 45 to the center tap 46. The operation of filters and flyback diodes is well-known and it is not believed necessary to describe it in detail.

The switching of the silicon controlled rectifiers 20 and 30 is controlled by a gating signal arrangement which is responsive to variations in the input line voltage appearing across the input terminals 11a and 11b. The gating signal arrangement includes a timing circuit 44 and a reference circuit 43. Each of these circuits is connected to the converter transformer 10. The reference circuit 43 generates a reference voltage and the timing circuit 44 generates a time varying voltage responsive to input voltage variations. The reference voltage and the time varying voltage are combined to derive the gating signal utilized to turn on the silicon controlled rectifiers 20 and 30.

The reference circuit 43 is connected across the winding 13 of the converter transformer 10. The reference circuit 43 includes a Diac diode 16 and a resistor 19 connected in series. A Diac is a bidirectional diode thyristor which may be utilized as a bidirectional voltage breakdown device. A description of the characteristics of a Diac may be found in the Silicon Controlled Rectifier Manual, fourth edition by the Semiconductor Products Department of the General Electric Company. The circuit may utilize other bidirectional reference voltage devices such as, back-to-back zener diodes or varistor devices in place of the Diac diode 16.

The timing circuit 44 is connected across the winding 14 of the converter transformer 10. The timing circuit includes a series connected capacitor 18 and resistor 17.

The Diac 16 and the resistor 17 are connected in series. The windings 13 and 14 which energize the Diac 16 and the resistor 17, respectively, are oriented so that the voltage drop across the Diac 16 and the resistor 17 oppose each other. The orientation of windings 13 and 14 is indicated by the polarity dot notation shown in FIG. 1. The combined voltage across the series connection of the Diac 16 and the resistor 17 is utilized as the offset gating signal to control the silicon controlled rectifiers 20 and 30.

Figure 2:
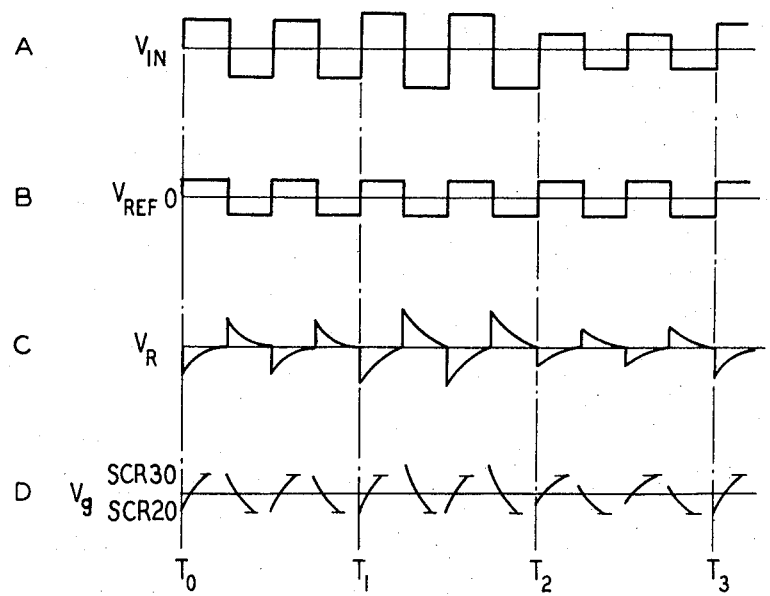
FIG. 2 shows waveforms which illustrate the operation of the circuit shown in FIG. 1.

The principles of the operation of the invention may be readily acquired by explaining a typical cycle of operation of the converter circuit described above. The voltage waveforms in FIG. 2 illustrate the voltages appearing at certain points in the circuit. For illustrative purposes assume that a square wave signal of the proper magnitude is applied by source 15 to the input winding 11 at the time $T_0$ as shown in FIG. 2. As shown by waveform A in FIG. 2, the polarity of this signal is positive at time $T_0$. This signal is applied to winding 11 so that the terminal 11A is positive. Therefore, according to the winding orientation as shown by the dot notation, the terminals 12a, 13a and 14a of the output windings of the converter transformer 10 are also positive. At this instant the silicon controlled rectifier 30 is biased in a forward direction but is not conducting at the instant $T_0$. A fixed reference voltage is generated across the Diac 16 which, at this instant, is positive to negative in the direction from terminal 16a to 16b. This reference voltage is shown by waveform B in FIG. 2.

The timing circuit 44 comprising the capacitor 18 and the resistor 17 at the time $T_0$ develops an instantaneous voltage across the resistor 17. At the instant $T_0$, there is no voltage across the capacitor 18 and all the voltage across winding 14 appears across the resistor 17. The polarity of this voltage, shown by waveform C, is positive to negative in the direction from terminal 17a to 17b. As shown by waveform C in FIG. 2, the voltage across resistor 17 opposes the reference voltage across the Diac 16.

The capacitor 18 begins to charge up and the voltage across the resistor 17 decays exponentially. The opposite terminals of the series connection of the Diac 16 and the resistor 17 are connected to the gate control leads 31 and 21 of the silicon controlled rectifiers 30 and 20, respectively. The resultant offset voltage appearing across this series connection is shown by waveform D in FIG. 2. As the voltage across the capacitor 18 increases, the voltage across the resistor 17 decreases. Hence, the magnitude of the offset voltage applied to the gate terminal 31 increases. The rate of this increase determines the moment in time at which the forward biased silicon controlled rectifier 30 begins to conduct. The operation of the converter during the subsequent half cycle in which the silicon controlled rectifier 20 conducts is similar to that described above and hence is not described in detail.

The gating signal arrangement to control the switching of the silicon controlled rectifiers 20 and 30 responds to changes in the input line voltage to regulate the output voltage applied to the load 40. If the magnitude of the input voltage increases such as is shown at time $T_1$ in FIG. 2, the initial voltage across the resistor 17 will be greater. It will take longer for the voltage across resistor 17 to decay and hence the time at which the offset voltage increases to the triggering level of the silicon controlled rectifiers 20 and 30 will be delayed. Hence the voltage across the output load 40 will be reduced to its regulated value. If the input voltage decreases in magnitude, such as shown at time $T_2$ in FIG. 2, the initial voltage across the resistor 17 will decrease below its normal value. Therefore, the offset voltage will increase more rapidly and trigger the silicon controlled rectifiers 20 and 30 in advance of their normal triggering point so that the voltage output across the load 40 may be maintained at its regulated value.

What is claimed is:

1. A line voltage regulated converter comprising a transformer including a primary winding, a secondary winding, a reference winding and a timing winding, a rectifier comprising first and second silicon controlled rectifiers connected to said secondary winding and including control electrodes, a reference voltage breakdown device coupled to said reference winding, a timing network comprising a resistor and a capacitor connected in series and shunted across said timing winding, means to offset the voltage across said resistor against the voltage across said reference voltage breakdown device and means to couple said offset voltage to the control electrodes of said first and second silicon controlled rectifiers.

2. A line voltage regulated converter as defined in claim 1 wherein said means to offset includes said reference voltage breakdown device and said resistor connected in a series connection, the opposite terminals of said series connection being connected the control electrodes of said first and second silicon controlled rectifiers, respectively.

3. A converter circuit comprising input and output means, a transformer coupling said input and output means, controllable switching devices included in said output means and having control signal inputs, means to control said switching devices comprising:
    reference voltage means comprising a first winding on said transformer and a voltage breakdown device shunting said first winding, a timing circuit comprising a second winding on said transformer and an energy storage device and an energy dissipative device connected in series and shunting said second winding, means to offset the reference voltage drop across said breakdown device with the voltage drop across said energy dissipative device, and means to apply a voltage output of said means to offset to said control signal inputs.

4. A converter circuit as defined in claim 3 wherein said energy storage device comprises a capacitor and said energy dissipative device comprises a resistor, said voltage breakdown device and said resistance being connected in series whereby the voltage output of said means to offset is derived from the voltage drop thereacross.

5. A converter circuit as defined in claim 4 wherein said controllable switching devices comprise two silicon controlled rectifiers connected in a full wave rectifier configuration and the control signal inputs thereof are connected to opposite sides of the series connection of said voltage breakdown device, and said resistance, respectively.

* * * * *